June 18, 1963  R. BIRMANN  3,093,959
COMPOUND POWER PLANT
Filed May 16, 1960  2 Sheets-Sheet 1

United States Patent Office 3,093,959
Patented June 18, 1963

3,093,959
COMPOUND POWER PLANT
Rudolph Birmann, Highland Farm, Newtown, Pa.
Filed May 16, 1960, Ser. No. 29,314
9 Claims. (Cl. 60—13)

This invention relates to an improved compound power plant consisting of a reciprocating piston engine of the two stroke cycle type, the crankshaft of which delivers the total useful power output, and a free-running turbine which is motivated by the exhaust gases of the engine and drives a centrifugal compressor that precompresses and forces through the cylinders of the engine the entire air flow required for scavenging and charging the engine. A compound arrangement of this type is generally known as a turbocharged two-cycle engine.

One object of this invention is to greatly improve the thermal efficiency of the turbocharged two-cycle engine.

Another object is to provide an arrangement which uses the full downstroke of the piston for the production of useful power output.

A further object is to simplify the construction and to improve the reliability of the engine by eliminating the piercing of the cylinder walls by any air and/or gas ports.

Still a further object is to control the flow into and out of the cylinders by means which provide for very large flow areas annd streamlined flow so that the resistance to the flow through the engine is reduced.

Another object is to make it possible for the turbocharger to be the sole source of air supply to the engine and eliminate any auxiliary devices for supplying air to the engine, while at the same time preventing the turbocharger r.p.m. from dropping below the minimum self-sustaining r.p.m., even at low-engine r.p.m. and light engine load.

The two-cycle type of engine, not being self aspirating in the manner of the four-cycle engine, depends on a separate air-moving device to bring about the gas change process; i.e., to scavenge the cylinders and fill them with a fresh charge. If the engine is turbocharged for the purpose of increasing its output, it is obviously desirable to use the turbocharger not only for supercharging the engine, but for scavenging as well. To acocmplish this it is necessary that the back-pressure occasioned by the turbine be at all times lower than the air pressure delivered by the turbocharger compressor since otherwise flow through the engine cylinder would not be possible. This pressure difference Δp should be as small as possible, which can only be accomplished by providing very large flow areas and reducing the flow resistance through the engine to a minimum. On the other hand, to make it possible for the discharge pressure of the turbocharger compressor to be higher than the turbine inlet pressure, the turbocharger component efficiencies must be high. Large enough flow areas through the engine, low enough flow resistance therethrough, and high enough turbocharger efficiencies necessary for self-sustained (unassisted) turbocharger operation, can presently only be achieved with very large low speed engines. But even with such engines, special provisions are needed to assure self-sustained turbocharger operations at all engine loads; for example, the energy in the exhaust pulses must be recovered by means of complicated exhaust manifolds and multiple turbocharger installations. In most turbocharged two-cycle engines, the turbocharger would be inoperative over a wide range of engine loads and speeds unless it is given assistance by a second blower which is driven from the engine crankshaft through mechanical connections. These solutions obviously complicate the installation, reduce the net power output of the engine, and lower its thermal efficiency.

In all known two-cycle engines the cylinder charge enters through ports in the cylinder wall which are uncovered by the piston during the second half of its downtravel, and is discharged through a second set of ports also in the cylinder wall, or through valves in the cylinder head. Such ports which pierce the cylinder are very undesirable because they induce thermal stresses in the cylinder structure, cause rapid wear of the piston rings, are a source of trouble due to carbon, and waste of lubricating oil. Furthermore, they break up the flow into a multitude of streamlets and cause eddying so that the scavenging efficiency is seriously reduced and the flow resistance increased. Additionally, these ports, since they occupy one-third or more of the cylinder height, make a large percentage of the engine piston stroke ineffective for power production.

Finally, because of these ports, the expansion ratio of known two-cycle engines must be the same or smaller than the compression ratio which results in a very substantial reduction of the thermal efficiency.

The above cited shortcomings of the conventional two-cycle engine account for the fact that this type of engine has been unable to displace the four-cycle engine despite its outstanding advantage which lies in each downstroke of the piston being a powerstroke.

The attainment of the objects of the invention will become apparent from the following description, read in conjunction with the accompanying drawings, in which.

The general aspect of the invention will first be described by reference to FIGURES 1, 2 and 3, this being followed by a description of certain design modifications which solve special problems which are depicted by and described in connection with reference to FIGURES 4, 5, 6 and 7.

Figure 1:
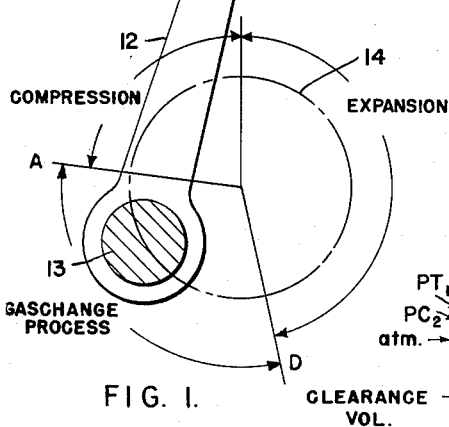
FIGURE 1 is a fragmentary sectional view of an engine cylinder, also showing in diagrammatic fashion the turbocharger by which it is served.

FIGURE 1 represents the cylinder, cylinder head and piston of an internal combustion engine which may be of the diesel or spark ignition type and may have any desired number of such cylinders with its pistons connected to a crankshaft in usual fashion. In this figure, 10 indicates the cylinder in which the piston 11 is made to reciprocate by the action of the connecting rod 12 and the crank pin 13 of the crankshaft. The circular path described by the center of this crank pin is indicated by circle 14. The upper end of the cylinder is closed by the cylinder head 15, which contains a single large poppet valve 16 (shown in open position) arranged coaxial with the cylinder 10. This valve consists of the hollow valve stem 17 and the valve disc 18 which in closed position of the valve seats on valve seat 19. The valve is opened in conventional fashion by cam 20 and closed by spring 21. If the valve is open, which is the case during approximately one-half of each upstroke of the piston, the interior of the cylinder communicates with the inlet air passage 22 that surrounds approximately one-half of the valve disc as shown by FIGURE 2 and also communicates with the exhaust passage 23 which surrounds the other half. Flow of exhaust gases takes place through this exhaust passage into exhaust manifold 24 and through the turbocharger turbine 25, and eventually to the atmosphere. The turbocharger compressor 26 driven by this turbine delivers air at a pressure (which is higher than the exhaust back pressure or the initial turbine pressure by an amount $\Delta p$) through the intercooler 27 to the inlet passage 22 from where it flows into the cylinder. This air displaces the residual exhaust gases remaining in the cylinder and following such displacement or scavenging, the air (or air fuel mixture in the case of a spark ignition engine) is compressed during the up-travel of the piston, in preparation for the combustion which occurs when the piston reaches the upper end of its travel. This combustion can take place in any one of several well-known fashions, such as combustion at constant volume or at constant pressure, and it can be initiated by spark ignition or by compression ignition. Since the means for ignition and also the means for supplying fuel are perfectly conventional and can be freely chosen to suit the application of the invention, fuel injection means is merely conventionally shown at 9.

The combustion is associated with an abrupt temperature and pressure rise of the charge that is trapped in the cylinder and is followed by expansion during the subsequent down-travel of the piston. Expansion continues to the lower limit of the piston travel when valve 16 again opens and the aforedescribed process is repeated.

Figure 2:
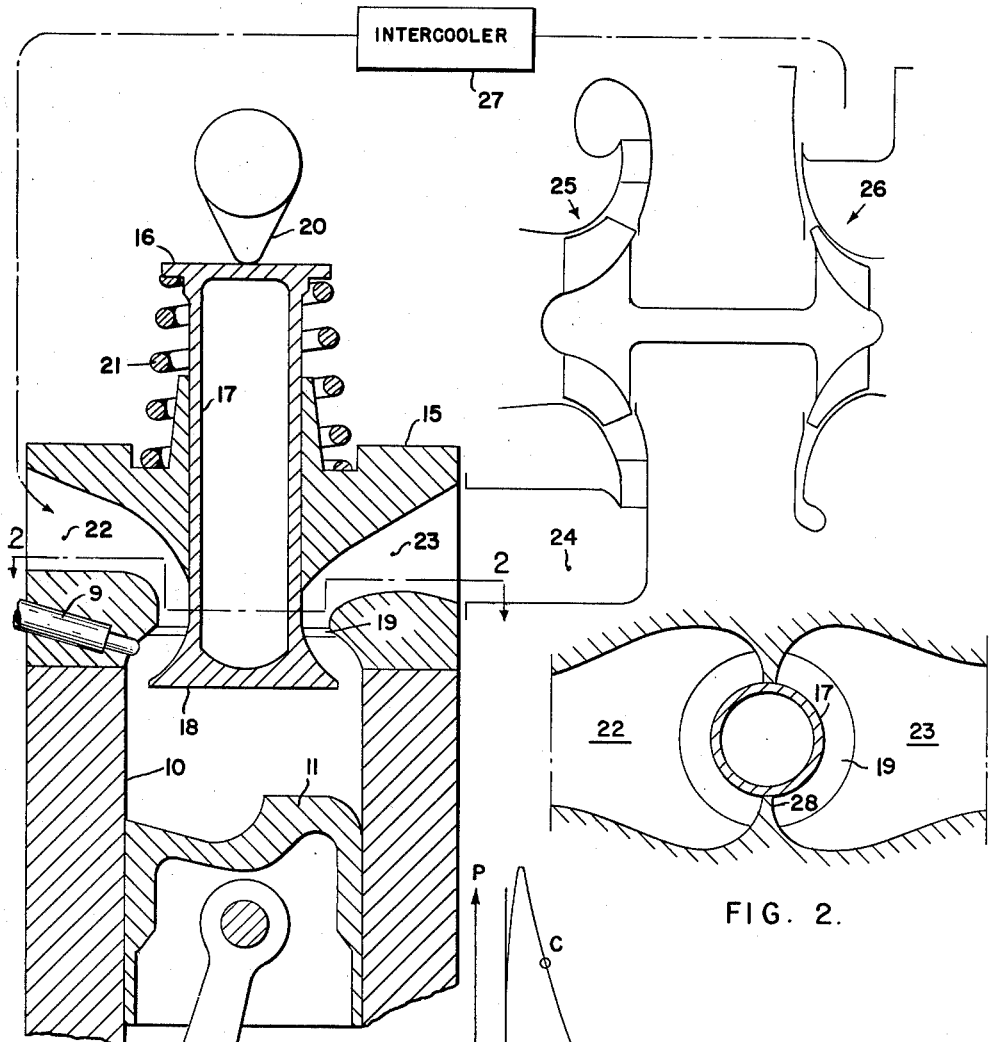
FIGURE 2 is a section taken on the surface 2—2 of FIGURE 1.

When valve 16 is closed there is no communication between air passage 22 and exhaust passage 23 because the separating wall 28 in FIGURE 2 between these two passages extends to the valve stem 17 and clear down to the interior surface of the valve disc 18. During opening of the valve the upper surface of the valve disc 18 does not contact partition wall 28 any longer and a small area affording communication between inlet passage 22 and exhaust passage 23 is open. However, since this by-pass area amounts to only approximately 10% of the valve area and furthermore because the direction of the velocity of the thru-flow tends to inhibit shortcircuiting, there is virtually no by-passing and loss of scavenging air.

Since valve 16 serves both for inflow of the fresh charge and for outflow of the exhaust gases it can be termed a dual flow single valve. Each of the respective flow passages 22 and 23 in the cylinder head 15 extends only over one-half of the valve circumference, and there is no necessity for the flow to cross over and sweep past the valve stem 17, the diameter of which can, therefore, be quite large. Furthermore, the aforedescribed unique configuration of the flow passages result in an aerodynamically extraordinarily clean flow and in correspondingly low flow losses and minimum restriction effects, which together with the much larger flow areas that can be provided by means of the dual flow single valve reduces the resistance to flow through the cylinder far below the flow resistance of conventional ports and/or multiple valves. Compared with these conventional flow controlling devices the flow is not broken up into a multitude of streamlets with eddy zones between them, but as the result of the configuration of the passages that are associated with the dual flow single valve, the flow enters, passes through the interior and out of the cylinder in a homogeneous well-directed flow column, which results in a hitherto unattained high scavenging efficiency together with maximum cooling of the cylinder walls and at the same time minimum dilution of the exhaust gases with excess scavenging air. Other advantages of the dual flow single valve are the effective cooling to which it is subjected by the incoming flow and the fact that the valve stem can be given a very large diameter and made hollow so that a very desirable light weight high strength structure is achieved. The aforementioned valve cooling is particularly effective if the valve is rotated around its center line during opening and closing by means of a conventional valve rotating device, and if the interior of the hollow valve stem is filled with a liquid metallic heat carrier such as sodium to intensify the transportation of heat from the side of the valve that is exposed to the hot exhaust gases to the side that is cooled by the incoming fresh charge.

Figure 3:
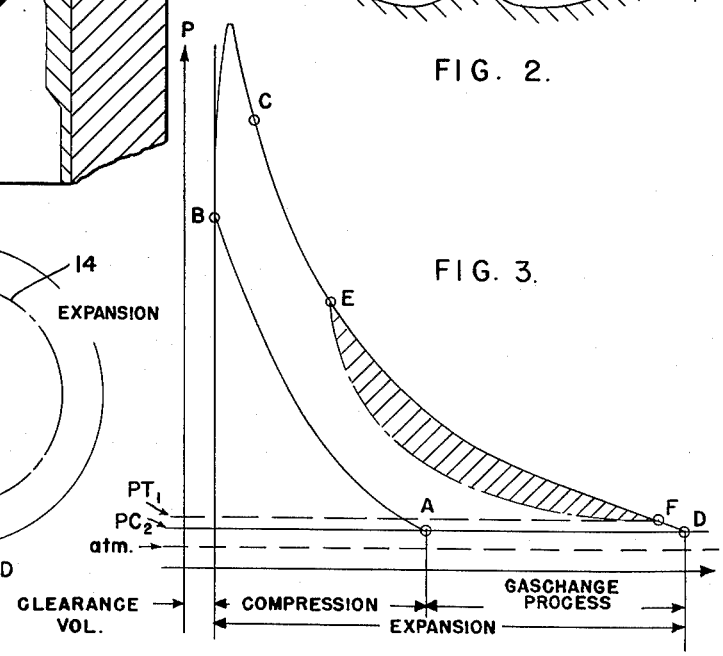
FIGURE 3 is a pressure-volume diagram illustrative of conditions of operation.

There may now be reviewed the thermodynamic cycle with reference to FIGURE 3, which is a pressure-volume diagram showing compression between A and B, combustion between B and C, and expansion between C and D. The gas change process (exhaust, scavenging and charging) occurs between state points D and A shown in the PV diagram, FIGURE 3, corresponding to the angular positions D and A of crankpin 13 (traveling on circle 14) indicated in FIGURE 1.

Attention is directed to the fact that, contrary to conventional two-cycle engines, the invention provides for the downstroke or power stroke to continue to practically the extreme end of the piston travel and for the gas change process to occur predominantly during the upstroke of the piston, whereas in conventional two-cycle engines one-half of the gas change process takes place during the downstroke and only the remainder occurs during the upstroke. It can readily be seen from FIGURE 3 that this relocation of the gas change period results in the expansion ratio as defined by piston volume at the end of the expansion divided by the cylinder clearance volume to be much greater than the compression ratio which is the piston volume at the beginning of the compression divided by the clearance volume. The expansion ratio being of the order of 1.8 times greater than the compression ratio results in the astonishing improvement of the thermal efficiency of more than 22%, compared with that of a conventional two-cycle engine in which the expansion ratio is the same or in most cases even smaller than the compression ratio. The great magnitude of this improvement is due to the basic fact that the thermodynamic efficiency of any internal combustion engine cycle depends on both the compression ratio and the expansion ratio and increases even more rapidly with increasing expansion ratio than it does with increasing compression ratio.

Figure 4:
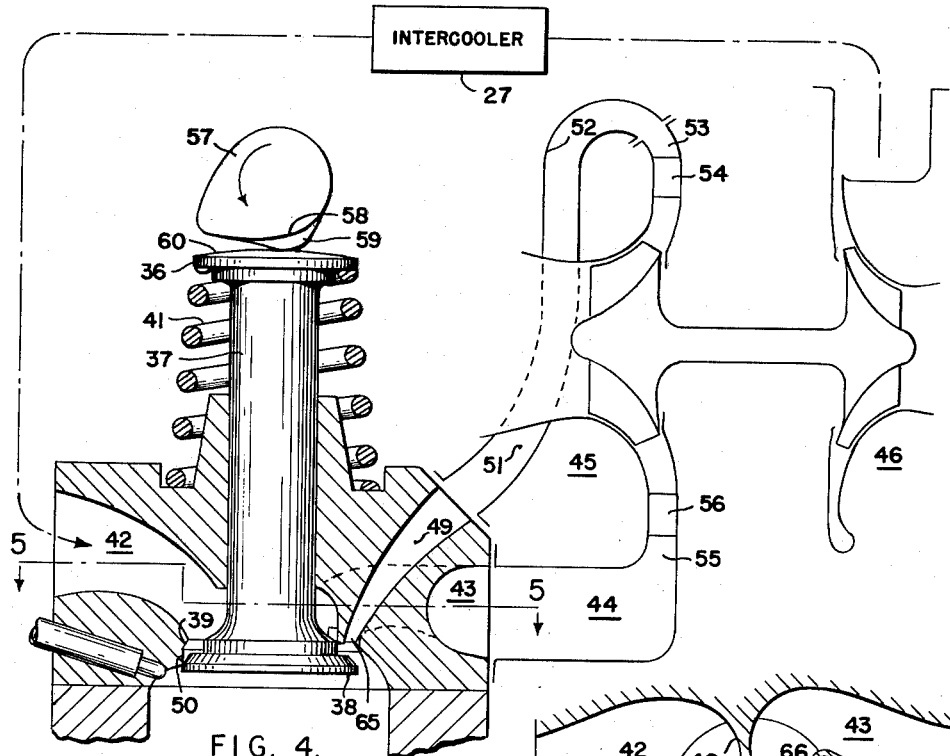
FIGURE 4 is a view similar to FIGURE 1 but showing an alternate construction, the view being a section taken on the surface indicated at 4—4 in FIGURE 5 and depicting the valve in its pre-exhaust position.
Figure 5:
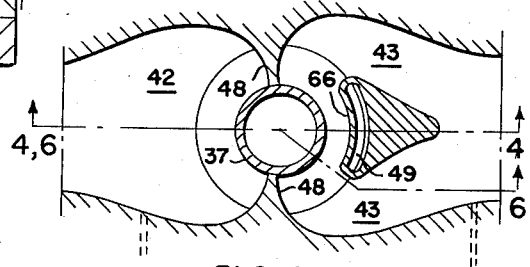
FIGURE 5 is a section taken on the surface indicated at 5—5 in FIGURE 4.

The large expansion ratio has the further advantage that it causes the pressure in the cylinder to drop to a value which is as low or even lower than that of the air supply pressure, so that both air inlet and exhaust discharge can be opened simultaneously without fear of exhaust gases discharging into the air supply passage. This explains why it is possible to control the admission to and the discharge from the cylinder by means of the single dual flow valve described in connection with FIGURE 1. In some cases it may not be desirable (for reasons which become evident further on) to carry the aforedescribed over-expansion far enough or, in other words, select a large enough ratio of expansion ratio to compression ratio to result in the pressure at the end of the expansion stroke to be as low as the air supply pressure. If in these cases exhaust and inlet were opened simultaneously, exhaust gases would "back up" into the inlet passage. The cylinder pressure must therefore be relieved by opening the exhaust slightly ahead of the inlet. This can easily be accomplished with the dual flow single valve by masking the intake portion of its valve seat as is shown by FIGURE 4. In this figure 36 is the single dual flow valve controlling the inflow of the fresh charge delivered by the turbocharger compressor 46 through the intake passage 42 as well as the outflow of the exhaust gases to the exhaust passages 43 and 49.

Around the intake half of the valve disc there is arranged a step 50 directly beyond (diametrically) the valve seat 19. This step prevents flow in or out through the inlet portion of the valve until the valve is lifted beyond the height of the step. This masking of the inlet portion causes the exhaust portion of the valve to be opened first and the opening of air admission delayed until some of the gases are discharged from the cylinder and the pressure has dropped to a low enough value to permit charge inflow during the subsequent opening of the air portion of the valve.

The greater the ratio between expansion ratio and compression ratio, the better the thermal efficiency and the lower the pressure in the cylinder at the end of the expansion stroke. As will be clear from an inspection of the PV diagram, FIGURE 3, any desired over-expansion can be achieved merely by selecting a suitably delayed beginning of the compression. Such a delay in the beginning of the compression extends the time period available for the gas change process; however, it reduces the weight of the fresh charge that can be trapped in the cylinder when the compression begins, and thereby reduces the amount of fuel that can be burned and, consequently, the power the engine can develop. To increase this power the weight of the trapped charge must be increased by highly precompressing it in the turbocharger compressor. This explains why, for a given power output of an engine constructed in accordance with the invention, the turbocharger compressor must operate at a higher pressure level (for example, within the range of pressure ratio 2 to 3) than would be necessary, or could even be tolerated in connection with conventional two-cycle engines. The latter would be prohibitively overloaded by high pressure turbocharging and therefore generally operate with a turbocharger pressure ratio in the neighborhood of 1.4. At first glance the need for high turbocharger pressure ratios would seem to be a disadvantage. In reality, it is one of the many advantages of the invention by reason of the well-known fact that for a given pre-turbine temperature a turbocharger can be self-sustaining; i.e., produce unassisted a compressor discharge pressure that is higher than the turbine inlet pressure by an amount sufficient for maintaining flow through the engine only if the pressure ratio is of the order of 2–3, whereas with low pressure ratios self-sustained operation becomes impossible.

From the description of the invention presented thus far, it can be seen that every prerequisite for self-sustained and unassisted operation of the turbocharger is fulfilled; viz., the turbocharger pressure level during normal operation is high, the engine scavenging efficiency is high, the engine flow resistance is low. In addition to these factors, it is of course also necessary that the turbocharger efficiency be high and that its air delivery characteristics are suitable. Both of these requirements can best be achieved by the improved turbocharger described in my co-pending application Serial No. 825,773, filed July 8, 1959, now Patent 3,059,415. Fulfillment of all these important requirements by the embodiment of the invention described in connection with FIGURE 1, makes possible the self-sustained operation of the turbocharger over the entire load range from idling to full load of at least certain types of engines. These types include very large, low speed diesel engines of the heavy duty type because these engines, on account of their large size and low speed, have a particularly low flow resistance, and their turbochargers can have combined (turbine, compressor and mechanical) efficiencies of over 70%. Also included are most spark ignition engines because their exhaust temperature is higher than that of diesel engines, which makes more energy available to the turbine.

For some other types and applications of engines, for example, for small high speed diesel engines or for spark ignition engines which must develop a high torque at low engine r.p.m., the turbocharger may not be self-sustaining under all engine operating conditions and it may then become necessary to feed extra energy to the turbocharger, giving it assistance to enable it to continue operating properly; for example, under conditions of low engine r.p.m., and/or light engine load. In the modified form of the invention shown by FIGURES 4, 5 and 6, whatever assistance the turbocharger requires (for example, during low speed or light load operation of the engine) is supplied in a novel manner by high pressure gases extracted from the engine cylinder during the expansion stroke before the exhaust valve is fully open and the final exhaust, scavenging and gas change process take place. The high pressure gases extracted from the cylinders early during the expansion stroke contain a large amount of heat and pressure energy which is supplied to the turbine to make up for whatever lack of such energy there may be in the normal exhaust during the aforementioned engine operating conditions.

Figure 6:
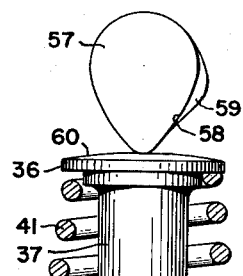
FIGURE 6 is a section taken on the surface 6—6 of FIGURE 5 and showing the same valve as in FIGURE 4 during the final exhaust and scavenging events.

FIGURE 4 shows the single multiple flow valve 36 partially open as it may be long before the power stroke is completed. In this partially open position the air intake portion is masked, as just described, by step 50. This same step continues circumferentially far enough around the valve disc 38 to also mask the inlets to the lower pressure exhaust passage 43 without, however, extending over the high pressure exhaust passage 49 which is open, therefore, so that high pressure gases can flow through passage 49, exhaust manifold branch 51, separate inlet 52, to a separate nozzle box compartment 53 of turbine 45. In the passages of the high pressure turbine nozzles 54 contained in this compartment the gases are expanded and are directed into the turbine wheel so as to drive it. These high pressure nozzles occupy only a small fraction of the full circumference of the turbine nozzle ring and have a flow area which is only approximately one-tenth of that of the low pressure nozzles occupying the rest of the nozzle ring circumference. By reason of this small area of the high pressure nozzles the pressure of the flow extracted from the engine cylinder remains high. The turbine is therefore effectively energized and thus capable of driving the compressor at the high speeds necessary for the proper air delivery to the engine cylinders. Because the aforedescribed turbine energizing gas flow is extracted from the cylinder before the expansion is completed, when the pressure and density are high, the area at the entrance to passage 49 can be quite small even for the extraction of a large percentage of the cylinder charge. This leaves ample room for the accommodation of the low pressure exhaust passage 53 around the exhaust side of the valve. Flow into this low pressure exhaust passage occurs as soon as the valve lifts over step 50 (partially surrounding the valve seat 39) to open fully as shown by FIGURE 6. By the time this occurs the pressure in the cylinder has dropped to a small enough value to permit the fresh air charge to enter through air passage 42. This fresh air scavenges or pushes out the residual exhaust gases together with some excess scavenging air into the low pressure exhaust passage 43 and through the low pressure exhaust manifold branch 44 to the low pressure nozzle box compartment 55 of the turbine 45. The total flow area of the low pressure turbine nozzles 56, which are fed from this compartment, is dimensioned to suit normal full load, full speed operation of the engine, and must therefore be quite large so that the low pressure nozzle ring section occupies all but a small fraction of the nozzle ring periphery, this small fraction being allocated to the high pressure nozzles 54 as previously described. Since the passage areas available to the low pressure flow are large, the exhaust back pressure is low and the pressure drop through the turbine is small and under conditions of light engine load or low engine r.p.m. would be insufficient for driving the turbine without the assistance given by the high pressure gases. On the other hand, the $\Delta p$, the difference of air inlet and exhaust back pressures is high, which ensures excellent scavenging.

Upon completion of the gas change process the valve is closed. In its closed position there is no communication between the high pressure and low pressure passages 49 and 43, and therefore no leakage from one into the other because the upper surface of the valve disc contacts the innermost lip 65 of the partition wall 66 which separates these two passages. Reverse flow out of the high pressure passage 49 when the valve is fully open (as depicted in FIGURE 6) is prevented by the ram effect of the high flow velocity acting on the entrance to passage 49.

Figure 7:
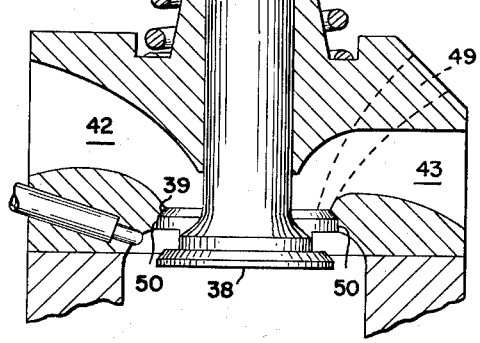
FIGURE 7 is a side elevation of the compound cam which actuates the valve of FIGURES 4 and 6, and also shows diagrammatically how the timing of the valve opening is automatically controlled.
Figure 7:
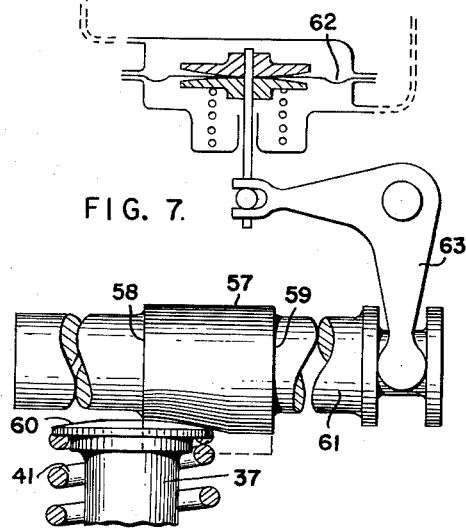

The problem of so actuating the valve that whenever necessary it is opened partially during the expansion stroke followed by full opening at or toward the end of this stroke when it normally opens fully immediately is a purely mechanical one, that can be solved in many ways. The particular solution shown by FIGURES 4, 6 and 7 is therefore presented merely as an example, for purposes of illustration.

The cam 57 opens the valve by acting directly against its end surface 60 which is pressed against the cam by spring 41. The left hand end of this cam has contour 58 and the other end has contour 59. These two contours merge smoothly into each other from one end of the cam to the other so that at each intermediate axial position there is an intermediate contour. Contour 58 is designed to open the valve when the piston reaches, or almost reaches the lower end of its travel. If contour 59 is in action the valve is opened partially earlier during the expansion stroke to be fully opened at the end of this stroke. It can therefore be seen that the desired conditions of valve opening are achieved by merely bringing into action the appropriate intermediate contour. This is achieved by shifting the cam shaft 61 along its center line, as is illustrated by FIGURE 7. This figure represents a partial side elevation of the cam shaft and shows how it is shifted by the action of diaphragm 62 being transmitted to the cam shaft through bellcrank 63. The upper diaphragm chamber is piped to the air inlet passage 42 and the lower chamber is connected to the low pressure exhaust passage 43. The force resulting from the difference of these pressures, $\Delta p$, is balanced by the spring 64, so that an increase of $\Delta p$, deflects the diaphragm downward and moves the cam shaft to the right, and vice versa. In this manner the minimum $\Delta p$ that assures adequate air flow through the engine is maintained by the turbocharger being energized with supplementary high pressure exhaust gases whenever low speed and/or light engine load conditions would not permit unassisted operation of the turbocharger. Generally under the normal full speed, full load operation of the engine the value of $\Delta p$ exceeds the above minimum and the cam shaft is all the way over to the right, in which position cam contour 58 is in action, which causes the valve to open fully immediately at or near the end of the expansion stroke.

The pneumatic coupling of the turbocharger to the engine in the manner described above can best be explained by means of the pressure volume diagram, FIGURE 3. Insofar as the gas change process D—A, the compression A—B, and the firing B—C which have previously been discussed are concerned, this diagram could be assumed to apply to low speed operation of a high speed engine, when the normal exhaust flow is insufficient and devoid of sufficient energy for the operation of the turbocharger so that the pressure of the air supplied is $P_{C_2}$. Under these conditions the exhaust valve automatically opens partially early during the power stroke, say at E in FIGURE 3, making available to the turbine a sufficient amount of heat and pressure energy contained in the high pressure, high temperature gases which are diverted from the cylinder to drive the turbine (pre-turbine pressure $p'_{T_1}$) and making it possible for the compressor to deliver the required quantity of air at the required pressure $P_{C_2}$. Because extraction of the gases begins at point E, the cylinder pressure from this point on drops rapidly along dashed line E—F. The slice of area between E and F shown by crosshatching in FIGURE 3 represents the energy that is taken away from the engine and allocated to the turbine.

It is obvious to those skilled in the art that the embodiment of the invention can take many different forms without departing from the spirit of the invention. For example, energization of the turbocharger by means of high pressure gases extracted from the engine cylinder during the expansion stroke need not to be carried out as described by letting these gases do work in the same turbine that serves for the expansion of the normal, low pressure exhaust gases. This could also be accomplished by means of a separate high pressure turbine which is arranged to operate in parallel with the low pressure turbine and drive through a common shaft the turbocharger compressor, or each of these two turbines could drive a separate compressor, the two compressors being connected in series.

The delivery of high pressure gases to a portion of a single turbine or to separate high and low pressure turbines may also be effected in another fashion. The cylinder may be provided with ports which are uncovered by the piston near the end of its expansion stroke, provision being made for communication between these ports and a passage corresponding to 51 to feed the high pressure gases to the high pressure nozzles of a turbine having both high and low pressure nozzles or to a turbine having only high pressure nozzles. While it has been indicated that the provision of ports uncovered by the piston is generally undesirable, this last mentioned expedient involves only a minor sacrifice of mechanical advantages in that such ports may be uncovered much later in the expansion stroke than the conventional ports. Since they are involved only in the liberation of the high pressure gases, and are promptly again closed during the beginning of the succeeding stroke they will not be involved in the production of turbulence during the scavenging operation; in other words the gas change process takes place as heretofore described with both intake of air and outflow of exhaust gases controlled by the single valve in the cylinder head.

When this last mentioned expedient is adopted there is, of course, no necessity for the step arrangement of the valve seat, but the valve arrangement may be the same as that shown in FIGURE 1. The automatic control discussed above would not be involved, but this last mentioned arrangement may be used where the power plant is used under conditions not requiring automatic adjustment of operation.

It will be evident that various advantages of the invention may be used even if a turbocharger is not used, i.e., if a "charger" for supplying air is driven mechanically from the engine shaft.

While a specific form of the invention has been illustrated and described, it is to be understood that the invention is not to be construed as limited except as required by the following claims.

What is claimed is:

1. In combination, a two-stroke cycle engine comprising at least one cylinder and piston therein, an exhaust valve in the cylinder head, means for operating said valve, means providing a pair of exhaust gas passages controlled by said valve, said valve and means being arranged so that as the valve opens under the action of said operating means to provide exhaust from said cylinder one of said passages is opened before the other, turbocompressor means, said turbocompressor means having a pair of separate driving gas chambers communicating individually with said respective exhaust gas passages, and means for providing air from said turbocompressor to said engine.

2. The combination according to claim 1 in which said valve also controls an inflow passage through which the last mentioned means provides air to said cylinder.

3. A two-stroke cycle engine comprising at least one cylinder and piston therein, means for charging said engine at a pressure exceeding exhaust pressure, a valve seat in the cylinder head, a single poppet valve located in the cylinder head engageable with and movable from said seat, means for operating said poppet valve, and means providing inflow and outflow passages communicating with the space within said seat at circumferentially spaced locations, said valve controlling the opening of both of said passages to the cylinder.

4. An engine according to claim 3 in which each of said locations extends about approximately one-half of said seat.

5. An engine according to claim 3 in which the valve and seat are formed to open the outflow passage prior to the inflow passage when the valve is moved to open position by said valve operating means.

6. An engine according to claim 4 in which the valve and seat are formed to open the outflow passage prior to the inflow passage when the valve is moved to open position by said valve operating means.

7. An engine according to claim 3 in which two outflow passages are provided and in which said seat and valve are constructed to open one of said outflow passages before the other when the valve is moved to open position by said valve operating means.

8. A two-stroke cycle engine comprising at least one cylinder and a piston therein, means for charging said engine at a pressure exceeding exhaust pressure, said piston continuously closing the cylinder at the piston end of the cylinder during its movements, and means controlling exhaust from and inlet of air to said cylinder, said means maintaining the cylinder closed throughout substantially all of the outward stroke of the piston, and said means controlling exhaust and entry of air primarily during the inward stroke of the piston.

9. A two-stroke cycle engine comprising at least one cylinder and a piston therein, means for charging said engine at a pressure exceeding exhaust pressure, said piston continuously closing the cylinder at the piston end of the cylinder during its movements, and means controlling exhaust from and inlet of air to said cylinder, said means being timed to provide a piston displacement volume ratio between the end and the beginning of the expansion part of the cycle which is substantially larger than the piston displacement volume ratio between the beginning and the end of the compression part of the cycle.

References Cited in the file of this patent

UNITED STATES PATENTS

| | | |
|---|---|---|
| 2,222,134 | Augustine | Nov. 19, 1940 |
| 2,471,509 | Anderson | May 31, 1949 |
| 2,571,256 | King | Oct. 16, 1951 |
| 2,624,171 | Kollsman | Jan. 6, 1953 |
| 2,714,881 | Bancel | Aug. 9, 1955 |
| 2,838,907 | Cowland | June 17, 1958 |
| 2,932,156 | Eckert et al. | Apr. 12, 1960 |